Jan. 28, 1964 H. T. WHITE 3,119,342
MOTOR DRIVEN PUMPS
Filed June 19, 1961
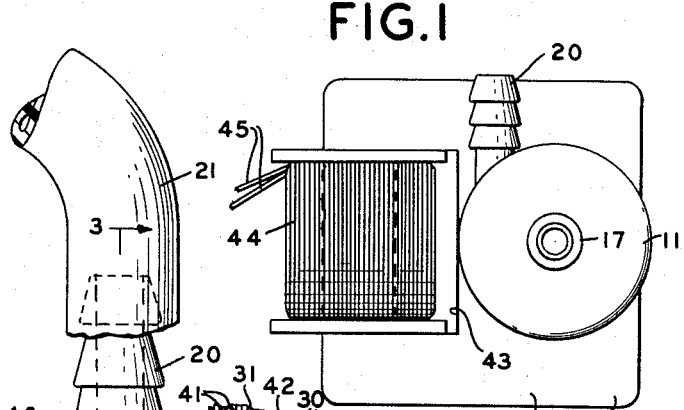
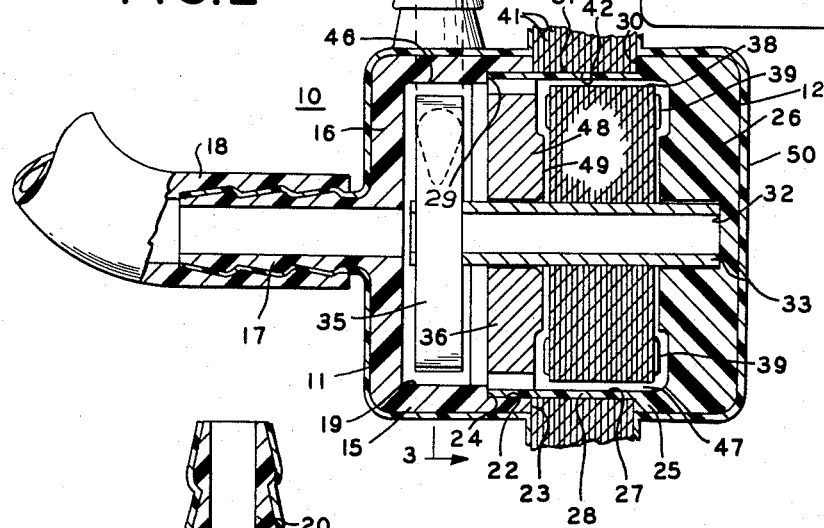
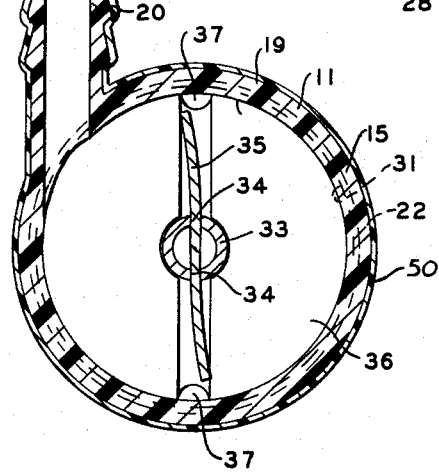
INVENTOR.
HOWARD T. WHITE
BY
ATTORNEY

United States Patent Office 3,119,342
Patented Jan. 28, 1964

3,119,342
MOTOR DRIVEN PUMPS
Howard T. White, Melrose Park, Pa., assignor to Fostoria Corporation, Huntingdon Valley, Pa., a corporation of Ohio
Filed June 19, 1961, Ser. No. 117,924
8 Claims. (Cl. 103—87)

This invention relates to motor driven pumps.

In the manufacture of motor driven pumps of small fractional horsepower, it is essential that the same be of inexpensive construction, capable of quick and easy assembly, and at the same time have freedom from operating difficulties, and long useful life.

It is the principal object of the present invention to provide a motor driven pump of sealless type and of small size in which a relatively small number of parts are required and in which the parts can be readily constructed and assembled.

It is a further object of the present invention to provide a motor driven pump of small size in which the motor rotor and impeller are isolated from the motor stator and in which fluid circulation is provided in the interior of the housing for motor rotor cooling.

It is a further object of the present invention to provide a motor driven pump in which a common housing is provided for the impeller and motor rotor, the housing preferably being made in two sections from molded synthetic plastic material and being capable of quick and easy assembly while providing adequate support and suitable bearings for the rotor.

It is a further object of the present invention to provide a motor driven pump of fractional horsepower in which the motor stator is exteriorly disposed and in which the assembly is protected mechanically and electrically in a simple but effective manner.

It is a further object of the present invention to provide a motor driven pump of fractional horsepower in which simplified provisions are employed for the rotor mounting which include an inserted bearing disc and an integral part of the housing.

It is a further object of the present invention to provide a motor driven pump of fractional horsepower having a simplified motor rotor and impeller construction.

It is a further object of the present invention to provide a motor driven pump of fractional horsepower in which a bearing disc for the shaft in the housing provides a separation between an impeller chamber and a motor rotor chamber.

Other objects and advantageous features of the invention will be apparent from the description and claims.

The nature and characteristic features of the invention will be more readily understood from the following description, taken in connection with the accompanying drawings forming part thereof, in which:

FIGURE 1 is a view in elevation of a motor driven pump in accordance with the invention, as seen from the pump end;

FIG. 2 is a fragmentary central sectional view, enlarged, taken along the longitudinal axis of the rotor; and FIG. 3 is a transverse sectional view taken approximately on the line 3—3 of FIG. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is shown, a housing 10 is provided preferably consisting of two axially aligned sections, one of which is a pump housing section 11 and the other of which is a motor housing section 12. The pump housing section 11 has a cylindrical wall 15 and an end closure wall 16, and extending centrally axially therefrom, a fluid inlet connection 17 for the attachment of a pipe or tube 18 for fluid supply. The interior surface 19 of the housing section 11 is preferably cylindrical and has extending tangentially therefrom a fluid delivery connection 20 for the connection of a fluid discharge pipe or tube 21. The pump housing section 11 preferably also has an annular interior recess or groove 22 extending longitudinally from an end face 23 and terminating at an inner end face 24.

The motor housing section 12 with the pump housing section 11 provide the entire enclosure for the rotating parts of the assembly. The housing section 12 has a cylindrical wall 25 and an end closure wall 26 with an interior surface 27 which is preferably cylindrical and of the same internal diameter as that of surface 19 of the housing section 11. The cylindrical wall 25 has a thin walled cylindrical section 28 extending from an inner end face 29 to an outer end face 30, with a peripheral face 31 interfitting in the annular recess or groove 22, and with the end face 30 engaging the inner end face 24.

The housing sections 11 and 12 are each preferably made as a unitary integral piece of molded synthetic plastic material, and because of the small quantity of material required, can be made of a material which is a non-conductor of electricity and non-magnetic responsive and which additionally has self-lubricating qualities, such as nylon, Teflon, and a number of other synthetic plastic materials.

The housing sections 11 and 12, at the appropriate time in the assembly of the components are secured together in any desired manner, such as by an adhesive applied at the parts in contact at the recess or groove 22, or by heat sealing at this location, or in any other desired manner.

The end closure wall 26 has a blind opening 32 therein longitudinally axially disposed for the reception of a rotor shaft 33 formed from hollow metal tubing. The shaft 33 at one end thereof, is provided with slots 34 for the reception of an impeller 35 formed from a piece of flat strip material which is resistant to corrosion by the liquid being pumped, and which can advantageously be of stainless steel for some liquids to be pumped.

The shaft 33, after the insertion of the impeller 35 in the slots 34 can have the impeller 35 tack welded thereto.

The shaft 33 also extends through a bearing disc 36 the periphery of which is in engagement with the interior surface 27 of the housing section 12, abuts against the inner end face 24, and is provided with opposite slots 37 for fluid circulation, as hereinafter explained.

The shaft 33 also has secured thereon a motor rotor 38 of any preferred type, and which can advantageously be of the laminated short circuited type with short circuiting bars 39.

The motor stator 40 preferably includes a plurality of plates 41 which have aligned openings 42 therethrough for engagement with the exterior surface 31 of the thin walled section 28 of the housing section 12, the endmost plates 41 being in engagement respectively with the end face 23 and with the end face 30.

The plates 41 also have aligned openings 43 for the mounting thereon of a winding 44 for providing the desired electromagnetic field for actuation of the motor rotor 38. The bearing disc 36 can have a boss 48 formed thereon with an end face 49 which serves as a thrust face for limiting the movement of the rotor 38 to the left as seen in FIG. 2.

The motor is preferably of the shaded pole type and has power leads 45 extending from the winding 44 which can be connected to any suitable source of alternating current.

It will be noted that a simple rotor and impeller construction is provided which can be sequentially assembled by securing the impeller 35 to the shaft 33, mounting the bearing disc 36 on the shaft 33, and applying the laminations of the rotor 38 on the shaft 33.

The motor rotor and impeller assembly can then be assembled by insertion of the shaft 33 in the bearing hole 32 with the bearing disc 36 engaging the inner face 27. The housing sections 11 and 12 can then be quickly and easily assembled with the section 12 inserted at the groove or recess 22 and secured by the application of an adhesive at this location, by heat sealing or in any other manner to provide a seal.

The bearing disc 36 separates an impeller chamber 46 in the pump housing section 11 from a motor rotor chamber 47 in the motor housing section 12.

It will also be noted that the thin walled portion 28 of the housing section 12 inserted in the gap between the motor stator laminations 41 and the motor rotor 38 serves as an isolating sleeve preventing access of fluid to the stator laminations 41 and winding 44.

After the assembly has been completed the entire structure is preferably inserted in or spray coated with an enclosing coating 50 which may advantageously be an epoxy resin. In this manner, the motor laminations 41 will be protected against corrosion and the electrical insulation augmented. At the same time the surface of the housing 10 will be protected.

The motor driven pump as herein described can advantageously be made in sizes of the order of one one-hundredth to one five-hundredths of a horsepower.

The mode of operation will now be pointed out.

Upon energization of the winding 44, an electrical field is set up in the stator laminations 41 which causes the motor rotor 38 to be rotated thereby rotating the shaft 33 and the impeller 35.

Fluid available at the inlet connection 17 to the impeller chamber 46 is delivered through the discharge connection 20. A portion of the fluid is bypassed from the impeller chamber 46 through the slots 37 to the opposite side of the bearing disc 36 and to the motor rotor chamber 47 where it circulates and picks up heat from the motor rotor 38 and passes through the clearance between the motor rotor 38 and the thin walled section 28 and the clearance between the shaft 33 and the opening 32 and through the interior of the shaft 33 back to the impeller chamber 46 where it is mixed with the other fluid there present.

I claim:

1. A motor driven pump having a cylindrical housing of molded electrically non-conductive material comprising a pump housing section and a motor rotor housing section, said sections having spaced parallel end walls and each of said sections having a cylindrical wall integral with and extending from its end wall in longitudinal alignment with the cylindrical wall of the other section, one of said cylindrical walls intermediate the end walls having a portion for receiving a mating portion of the other housing section, one of said sections having an integral thin wall portion between said mating portions, a separating member interiorly disposed in said housing parallel to and between said end walls and with its periphery in engagement with one of said cylindrical walls and separating the interior thereof into an impeller chamber and a motor rotor chamber, said separating member having a central shaft receiving and bearing opening, the end wall of said motor housing section having a shaft receiving and bearing opening aligned with the opening in said separating member, a shaft extending through said central opening in bearing engagement therewith and extending into said end wall opening, said shaft having an impeller thereon in said impeller chamber and a motor rotor thereon in said motor rotor chamber interiorly of said thin wall portion, and a motor stator in engagement with the exterior of said thin wall section.

2. A motor driven pump as defined in claim 1 in which said housing sections have exterior facing wall portions extending outwardly from said thin wall portion, and said motor stator is provided in engagement with and between said housing section facing wall portions.

3. A motor driven pump as defined in claim 1 in which said separating member at the periphery thereof has openings for passage of fluid from the impeller chamber to the motor rotor chamber.

4. A motor driven pump as defined in claim 1 in which said separating member at the periphery thereof has openings for passage of fluid from the impeller chamber to the motor rotor chamber, and said separating member has an end thrust face for engagement by the motor rotor.

5. A motor driven pump as defined in claim 1 in which the exterior of the housing is provided with an enclosing covering of synthetic plastic material.

6. In a motor driven pump, a cylindrical housing of molded electrically non-conductive material having a pump section and a motor rotor section, each of said sections having an end wall and an integral cylindrical wall portion with an end in engagement with an end of the other of said wall portions intermediate the end walls and with a central longitudinally axially extending cylindrical interior space having an interior longitudinal face, a bearing disc in said space between said end walls having its periphery in engagement with said interior face, said bearing disc separating the space between said end walls into an impeller chamber and motor rotor chamber, a longitudinally axially disposed fluid inlet connection in communication with said impeller chamber and a fluid delivery connection extending through one of said cylindrical wall portions, the end wall of the motor rotor section having an interior opening providing a shaft support, a hollow tubular shaft journaled in said bearing disc and in said interior opening and having an impeller thereon in said impeller chamber and a motor rotor in said motor rotor chamber, said bearing disc having openings at the periphery thereof for fluid delivery from said impeller chamber to said motor rotor chamber for return through said hollow shaft to the impeller chamber, and a motor stator exteriorly mounted on said housing radially outwardly of said motor rotor.

7. A motor driven pump as defined in claim 6 in which said motor stator comprises a plurality of plates with an opening therethrough for said housing and an additional opening offset on one side from the cylindrical housing for a motor stator winding.

8. A motor driven pump housing assembly comprising a pair of longitudinally axially aligned hollow cylindrical housing sections of molded electrically non-conductive material with meeting portions and with opposite integral end closure walls, said meeting portions being inwardly with respect to said end closure walls but more closely spaced with respect to one end closure wall than to the other, one of said housing sections having an exteriorly disposed longitudinally extending fluid inlet connection and an exteriorly disposed tangentially extending fluid delivery connection, the other of said housing sections having an interiorly disposed longitudinally axially disposed central shaft end receiving socket, one of said housing sections having a peripheral portion on the exterior thereof for the reception of a motor stator, and said housing sections having opposite faces at the ends of said peripheral portion for the reception of a motor stator therebetween.

References Cited in the file of this patent

UNITED STATES PATENTS

| | | |
|---|---|---|
| 2,317,517 | Brace | Apr. 27, 1943 |
| 2,871,793 | Michie et al. | Feb. 3, 1959 |
| 2,875,694 | Carter | Mar. 3, 1959 |
| 2,906,208 | White | Sept. 29, 1959 |
| 2,920,574 | Sampietro | Jan. 12, 1960 |
| 2,925,041 | Sigmund | Feb. 16, 1960 |
| 2,971,467 | Konopka et al. | Feb. 14, 1961 |